United States Patent [19]
Gonzales et al.

[11] Patent Number: 5,289,577
[45] Date of Patent: Feb. 22, 1994

[54] PROCESS-PIPELINE ARCHITECTURE FOR IMAGE/VIDEO PROCESSING

[75] Inventors: Cesar A. Gonzales, Somers; Thomas A. Horvath, Stormville; Norman H. Kreitzer, Yorktown Heights; Andy G. Lean, Merrick; Thomas McCarthy, Peekskill, all of N.Y.

[73] Assignee: International Business Machines Incorporated, Armonk, N.Y.

[21] Appl. No.: 894,121

[22] Filed: Jun. 4, 1992

[51] Int. Cl.$^5$ .............................................. G06F 3/14
[52] U.S. Cl. ................................... 395/163; 395/166
[58] Field of Search ............................. 395/162–166; 340/747, 798–799; 364/200 MS File, 900 MS File

[56] References Cited

U.S. PATENT DOCUMENTS

| | | | |
|---|---|---|---|
| 4,376,588 | 3/1983 | Moeller | 400/322 |
| 4,480,314 | 10/1984 | McKelley, Jr. et al. | 364/900 |
| 4,646,075 | 2/1987 | Andrews et al. | 340/747 |
| 4,823,201 | 4/1989 | Simon et al. | 358/133 |
| 4,843,632 | 6/1989 | Lee et al. | 382/56 |
| 4,928,247 | 5/1990 | Doyle et al. | 395/164 |
| 4,949,280 | 8/1990 | Littlefield | 395/163 |
| 4,949,301 | 8/1990 | Joshi et al. | 364/900 |
| 4,985,766 | 1/1991 | Morrison et al. | 358/133 |
| 4,987,530 | 1/1991 | Wagner et al. | 364/200 |
| 5,007,100 | 4/1991 | D'Aoust et al. | 382/49 |
| 5,008,951 | 4/1991 | Koshi | 382/56 |
| 5,020,115 | 5/1991 | Black | 382/44 |
| 5,046,080 | 9/1991 | Lee et al. | 379/53 |
| 5,148,529 | 9/1992 | Veda et al. | 364/DIG. 2 |
| 5,185,599 | 2/1993 | Doornink et al. | 340/747 |

FOREIGN PATENT DOCUMENTS

| | | |
|---|---|---|
| 0425178A2 | 10/1990 | European Pat. Off. |
| 54-136135 | 10/1979 | Japan |
| 61-198988 | 9/1986 | Japan |
| 63-107269 | 5/1988 | Japan |
| 63-227276 | 9/1988 | Japan |
| 63-276973 | 11/1988 | Japan |
| 1-19479 | 1/1989 | Japan |
| 1-64469 | 3/1989 | Japan |
| 1-114985 | 5/1989 | Japan |
| 2-123489 | 5/1990 | Japan |
| 2211706A | 5/1989 | United Kingdom |

OTHER PUBLICATIONS

L64740 DCT Quantization Processor (DCTQ) Preliminary, Sep. 1990 (LSI Logic).
L64730 Discrete Cosine Transform Processor Preliminary, Jul. 1990 (LSI Logic).

*Primary Examiner*—Dale M. Shaw
*Assistant Examiner*—Kee M. Tung
*Attorney, Agent, or Firm*—Perman & Green

[57] ABSTRACT

A sequential process-pipeline (12) has a first processing stage (30) coupled to a CODEC (24) through a plurality of buffers, including an image data input buffer (28), an image data output buffer (26), and an address buffer (34). The address buffer stores addresses, each of which identifies an initial address of a block of addresses within an image memory (22). Each block of addresses in the image memory stores a block of decompressed image data. A local controller (18) is responsive to the writing of an address into the address buffer to initiate the operation of the CODEC to execute a Discrete Cosine Transformation Process and a Discrete Cosine Transformation Quantization Process.

24 Claims, 5 Drawing Sheets

PROCESS-PIPELINE ARCHITECTURE FOR IMAGE/VIDEO PROCESSING

CROSS-REFERENCE TO RELATED PATENT APPLICATION

This patent application is related to commonly assigned U.S. patent application Ser. No. 07/894,312, filed Jun. 4, 1992 entitled "Block Control Method and Apparatus for Digital Image CODEC Processors", by T. Horvath et al.

FIELD OF THE INVENTION

This invention relates generally to image processing systems and methods and, in particular, to parallel processing systems that employ pipelined image processing techniques.

BACKGROUND OF THE INVENTION

Constraints that are encountered in Single Instruction-Multiple Datastream (SIMD) and Multiple Instruction-Multiple Datastream (MIMD) parallel processing systems include the following.

In SIMD systems, a partitioning of an input data segment makes it difficult to achieve proper processor load balancing during parallel execution of the data segments. Also, an incremental data bandwidth requirement on the input data path becomes a design burden when it is desired to increase the number of parallel processors in the SIMD system.

In MIMD systems, complexities typically exist in data-flow communication and synchronization amongst the plurality of processors.

These problems become especially apparent when blocks of image data are being processed, such as when image data is being compressed (encoded) or decompressed (decoded). In that a source of image data, such as camera, or a sink for image data, such as a display monitor, operate in real time with fixed image data transfer rates, the image data processing system should be capable of keeping pace with the required source or sink image data transfer rate. That is, the image data processing system must be able to process the image data at a rate that prevents a loss of input image data, and/or that prevents the generation of undesirable visual artifacts when the image data is displayed.

To obtain an optimal processing performance from a process-pipeline architecture, the pipeline data-flow should be maintained as full as possible. However, this becomes difficult due to data-flow fluctuations that typically occur during the operation of such systems. Also, overall supervision of pipeline control can represent a costly overhead factor to a host system or a dedicated supervisory co-processor.

U.S. Pat. No. 5,046,080, issued Sep. 3, 1991, entitled "Video CODEC Including Pipelined Processing Elements" (J. S. Lee et al.) describes a videophone system that provides videophone service within a narrow band digital network. A host CPU 20 is coupled through a bus 21 and a common memory 24 to an image bus 28. The CODEC 25 is comprised of a plurality of processing elements (PEs) connected as a pipeline. Each PE includes a digital signal processor (DSP) and performs a part of the function of image coding. FIFO memory modules 64 are comprised of a flag circuit and FIFO memory. The flag circuit controls data flow between processing elements. The common memory is employed to store messages and performs synchronization between processing elements. No methodology is described for optimizing a pipeline architecture so as to efficiently operate with blocks of data.

It is thus an object of this invention to provide a process-pipeline architecture wherein data buffering and local control functions are inserted within the process-pipeline at the boundaries of discrete process-pipeline functions.

It is a further object of this invention to provide a process-pipeline architecture wherein discrete stages of the pipeline include local data and possibly address buffers, and a local controller to supervise local synchronization and timing.

It is one further object of this invention to provide a system for encoding and decoding blocks of video/image data, and to provide a methodology to optimize a pipeline architecture.

SUMMARY OF THE INVENTION

The foregoing and other problems are overcome and the objects of the invention are realized by an image processing system constructed with a process-pipeline architecture having a plurality of serially coupled computational routines or functions. Buffers, such as First In-First Out buffers (FIFOs), and a Local State Machine (LSM) are interposed between adjacent, serially coupled routines or functions. This sequential process-pipeline processing architecture minimizes the synchronization complexity in a MIMD environment, while also increasing the flexibility of the image processing system in accommodating incremental changes in functionality. Adding and inserting a new function or routine is accomplished by determining a new processing boundary in the serial process-pipeline structure, and inserting the new function or routine at the determined boundary.

Buffers, such as FIFOs, are inserted between processing stages to provide the pipeline structure with an ability to cope with a wide range of data-flow fluctuations.

In accordance with a further aspect of this invention, a Local State Machine (LSM) control block is inserted at the boundary between two adjacent processes so as to manage local synchronization tasks, thereby overcoming the problem related to the increased overhead required by a conventional host or dedicated co-processor. The LSM employs FIFO flags, in conjunction with an inter-process handshaking protocol, to determine a correct sequencing of processes in the process-pipeline architecture.

That is, this invention provides a sequential process-pipeline architecture with embedded buffers and Local State Machine control between processes. In combination, the buffers and the LSM provide dynamic storage buffers and also provide data-flow control of a process sequence. These features beneficially increase the flexibility of the system and the extensibility of the system to various applications including, but not limited to, image processing applications.

More particularly, an aspect of this invention provides a sequential process-pipeline for use in a data processing system. The sequential process-pipeline includes a plurality of processing stages each of which executes a Process on data organized as data blocks. The plurality of processing stages are serially coupled one to another for passing data blocks therebetween. A first one of the processing stages is coupled, at a data processing system resource interception boundary, to the data processing system for inputting data from and outputting data to the data processing system at a first data rate. A last one of the processing stages is coupled to a data source and/or a data sink operating at a second data rate that differs from the first data rate.

Each processing stage includes a data buffer interposed between the processing stage and an adjacent processing stage. The first processing stage further includes an interface data buffer interposed between the data processing system resource interception boundary and the first processing stage.

It is shown that a SIZE of each of the data buffers that are interposed between adjacent processing stages is determined in accordance with the relationship:

$$\text{SIZE OF BUFFER}_i = (RP_i - RP_{i+1}) \times Pmax,$$

where, for a processing stage that executes a Process$_i$, where i is Process sequence number associated with the processing stage in the process-pipeline, Pmax is a maximum time required to completely process a data block with the Process$_i$, RP$_i$ is a data rate produced by the Process$_i$, and RP$_{i+1}$ is a data rate from a next following Process$_{i+1}$.

The sequential process-pipeline further includes a local controller associated with each of the processing stages for controlling the execution of the Process by the processing stage.

In a presently preferred embodiment of this invention the data blocks are comprised of image data, and one of the processing stages executes a Discrete Cosine Transformation Process that generates coefficients, one of the processing stages executes a Discrete Cosine Transformation Quantization Process, and one of the processing stages executes a Process to reduce an entropy of the quantized Discrete Cosine Transformation coefficients.

In the presently preferred embodiment, the first one of the processing stages is coupled to a second one of the processing stages through a plurality of buffers, including an image data input buffer, an image data output buffer, and an address buffer. The address buffer stores addresses, each of which identifies an initial address of a block of addresses within an image memory. Each block of addresses in the image memory stores a block of decompressed image data. The local controller is responsive to the writing of an address into the address buffer to initiate the operation of the processing stages that execute the Discrete Cosine Transformation Process and the Discrete Cosine Transformation Quantization Process.

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

The following Detailed Description of the Invention is organized as follows: Section (A) describes, in reference to FIG. 1, a sequential process-pipeline architecture that is an aspect of the invention; Section (B) describes, in reference to FIGS. 2, 3, and 5, the overall construction and operation of a presently preferred embodiment of a video/image processing pipeline that is based on the embodiment of FIG. 1; and Section (C), in reference to FIGS. 4 and 6, describes in greater detail the presently preferred embodiment of the video/image processing pipeline.

Section (A)

Figure 1:
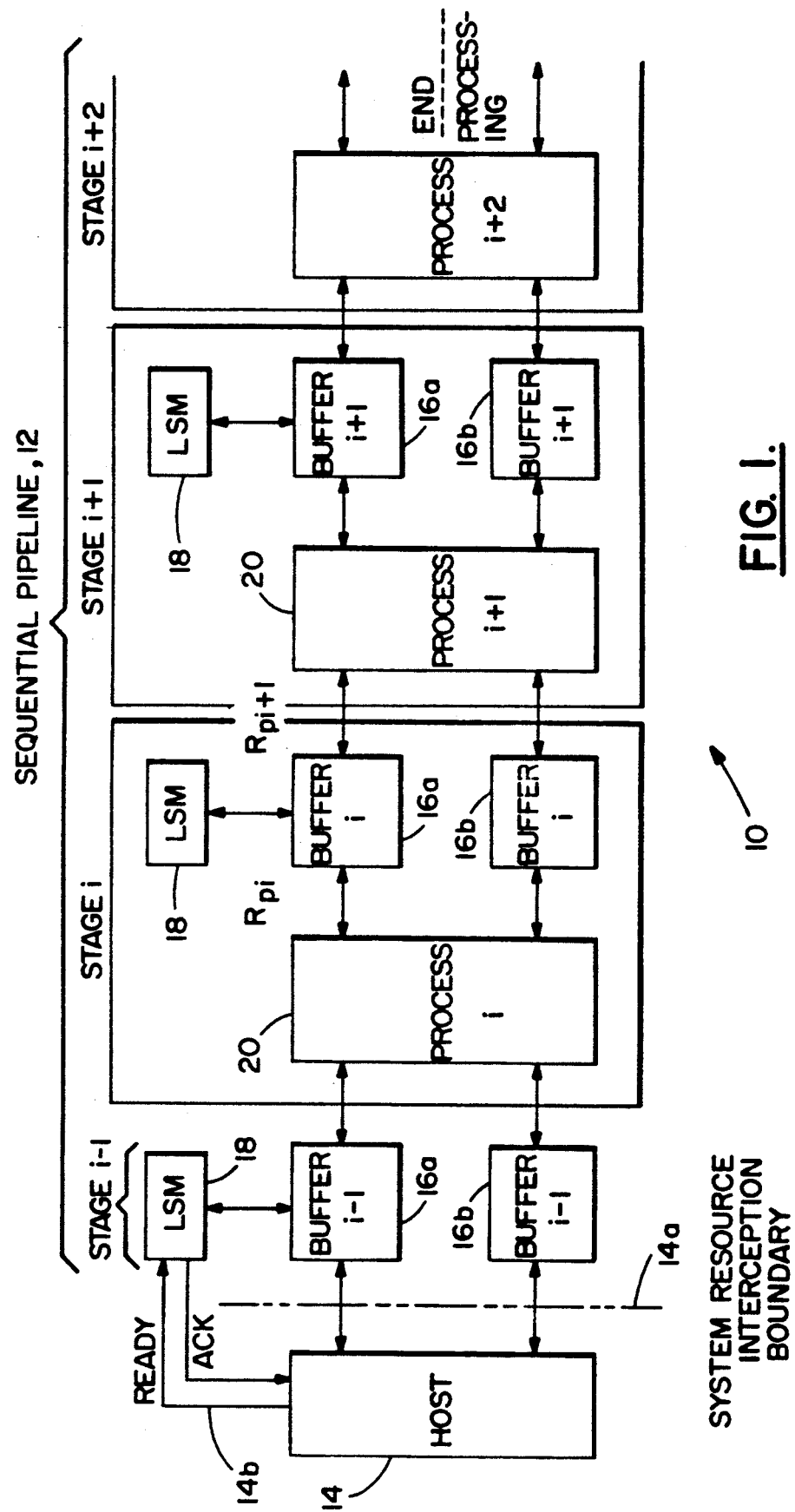
FIG. 1 is simplified circuit block diagram showing a portion of an image processing system and, in particular, showing a multi-stage sequential process-pipeline that is constructed and operated in accordance with the invention.

FIG. 1 is simplified block diagram showing a portion of an image processing system 10 and, in particular, showing a multi-stage (Stage$_{i-1}$ to Stage$_{i+1}$) sequential process-pipeline 12 that is constructed and operated in accordance with the invention. A host processor 14 is coupled, at a System Resource Interception Boundary (SRIB) 14a, to Stage$_{i-1}$ of the process-pipeline 12.

In general, the sequential process-pipeline 12 can be considered to be a series of processing units that are concatenated in a predetermined sequence of processes, the processes being partitioned based on their routine or function. The processes are intended to function in concert to achieve a desired computational end result.

Stages (i) and (i+1) of the process-pipeline 12 include, by example, first and second buffers 16a and 16b, a Local State Machine 18, and a Process block 20. The process-pipeline architecture of the invention is characterized by the systolic nature of the Local State Machines 18, each having associated buffers 16a, 16b functioning as a data reservoir. Controls and data are passed between Stages via the Process blocks 20 and the buffers 16a and 16b, under control of the LSMs 18.

The buffers 16a and 16b and the self-timed, LSM-driven processing control embodied in the sequential process-pipeline 12 are well-suited to perform a series of image processing operations and/or other operations on digital image data. This technique provides automatic, flexible process-pipeline control on a per-block basis throughout the process-pipeline, assuming that the process is self-triggered in the correct sequence.

Various aspects of the operation of the process-pipeline 12 are now described in detail.

PROCESS SYNCHRONIZATION

Based on a given requirement in data-throughput that the process-pipeline 12 is intended to fulfill, and tracing along the sequential processes in the process-pipeline 12, a worst case processing time of a process can be identified.

The maximum required time, expressed in a number of processing cycles for each computational routine or function, referred to herein as "Pmax", represents a largest number of processing cycle counts required to completely process a block of data. The magnitude of Pmax may thus be considered as a Global synchronization interval for every computational process. The resulting Global synchronous clocking, performed by the Host 14, signals the individual Processes 20 when to begin processing. This signalling is accomplished by the Ready line that is coupled across the SRIB 14a to the LSM 18 of Stage i−1.

Underlying the Global synchronization performed by the Host 14 is an inter-process data-flow communication that is locally managed by each embedded Local State Machine 18. The self-activated Local State Machine 18 that regulates and synchronizes each of the partitioned processes in the process-pipeline 12 executes the protocols, described in detail below, in determining the correct timing to achieve process synchronization.

It should be noted that the number of processing cycles for a non-computational event, such as the processing cycles required to perform a shared system memory resource arbitration, can at times dominate the total processing effort. The non-computational event is thus preferably accommodated with an override mode. Herein, a maximum time, or number of cycles, to accommodate the non-computational event is designated "Tmax", which is a system 10 resource-dependent variable. Tmax can exist if and only if a system 10 resource arbitration overhead (or maximum time required to perform resource arbitration), referred to herein as "Asys", is greater than Pmax. In FIG. 1, the Ready signal line 14b that is coupled between the Host 14 and the first LSM 18 of the sequential pipeline is employed as an Asys indicator, and serves as an override to the otherwise employed Pmax of the LSM 18. The Ready signal line 14b thus provides, when enabled, Global synchronization of the process-pipeline 12.

The protocols for each process can thus be described as follows in the exemplary pseudocode:

IF Asys is greater than Pmax AND IF the Buffer$_{i-1}$ is NOT EMPTY
Tmax=Asys;
start the PROCESS$_i$ for every Tmax cycle;
ELSE IF Asys is not greater than Pmax AND IF the Buffer$_{i-1}$ is NOT EMPTY
start the PROCESS$_i$ for every Pmax cycle; END IF.

The maximum system-dependent processing time (i.e. Tmax), by default, overrides and triggers the LSM 18, which otherwise employs the local self-timed criteria represented by Pmax. That is, a process must sometimes wait upon slower system arbitration until the longest processing cycle (i.e. Tmax) enables the process to start. This process-pipeline 12 mode of dynamic regulation thus integrates and accommodates system 10 resource timing.

The Buffers 16 between processes function to logically smooth out "density fluctuations" in the data-flow. The boundary Buffers 16 also serve another purpose: to separate a data-dependent process from a data-independent process. For many signal processing routines the relative sample rates at the data-flow nodes are data independent. Thus, an aspect of the invention that is embodied in the sequential process-pipeline 12 is the distinguishing of data-dependent processes from data-independent processes.

The decisions in where to define a process boundary and how to determine the associated Buffer 16 size amongst subsequent processes are dictated by factors that can be classified in three categories:

1. the system arbitration overhead (i.e., Asys) incurred from various resources;
2. the processing nature of the relative sample rates of the data-flow within a process (i.e., is a given process data independent?); and
3. the data bandwidth requirement or constraint on the input and on the output of each process 20 in the process-pipeline 12.

In order to accommodate a short-term rate mismatch between two adjacent processes 20, the size of the interposed Buffers are determined in accordance with the expression:

$$\text{SIZE OF BUFFER}_i = (RP_i - RP_{i+1}) \times \text{Pmax}, \quad (1)$$

where
Pmax is the Processing time interval, or maximum processing time, for each computational process,
$RP_i$ is a data rate produced by the Process$_i$,
$RP_{i+1}$ is a data rate from the next following Process$_{i+1}$, and
i is a Process sequence number in the process-pipeline 12.

For achieving continuous data-flow in the process-pipeline 12, the size of a Buffer 16 that intersects the SRIB 14a is considered separately. When intersection with system 10 resources occurs, Pmax in Equation (1) is replaced by Tmax, and the SIZE_SRIB of the interface data Buffer 16 at the SRIB is determined in accordance with the relationship:

$$\text{SIZE\_SRIB} = (Rp_i - RP_{i+1}) \times \text{Tmax}. \quad (2)$$

In accordance with the foregoing an aspect of the invention provides a method of defining a sequential process-pipeline for use in a data processing system. The method includes the steps of (a) defining a plurality of data processing stages each of which executes a Process on data organized as data blocks. Each of the stages is defined so as to, by example, segregate data-dependent Processes from data-independent Processes. A next step of the method (b) serially couples the plurality of defined data processing stages one to another in an order selected for accomplishing a desired Processing function. A third step of the method provided, at an interface between adjacent ones of the serially coupled data processing stages, a data block Buffer and a local controller for controlling the transfer of data blocks across the interface.

Section (B)

Figure 2:
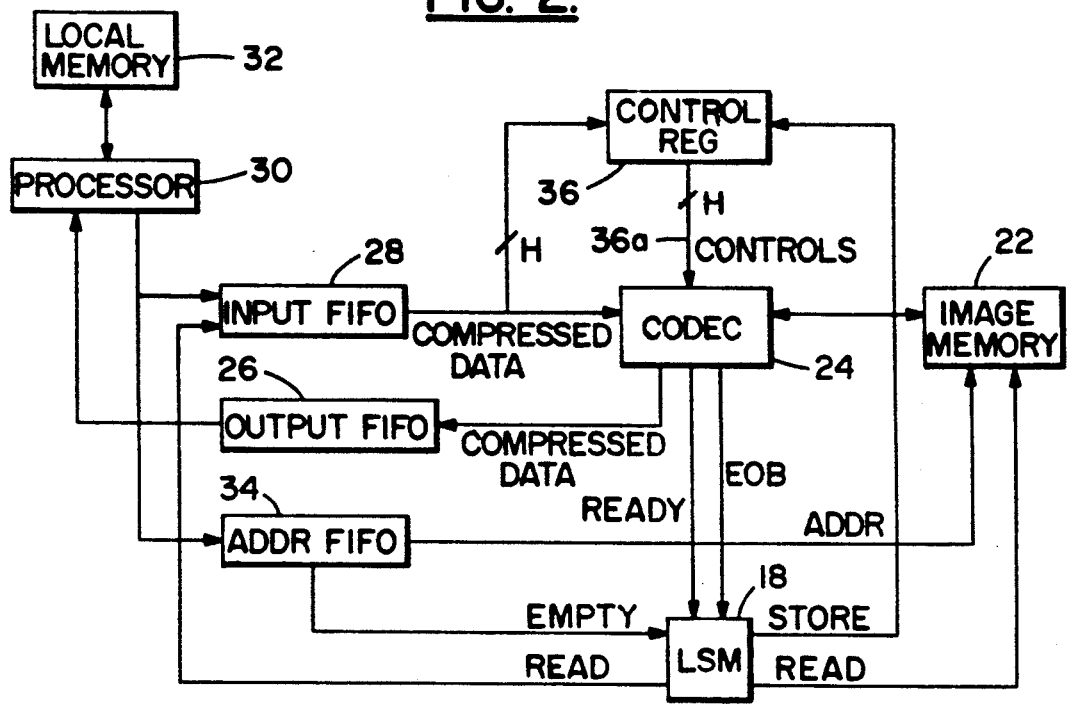
FIG. 2 is a simplified circuit block diagram showing an embodiment of an image data coding and decoding system that is constructed in accordance with the process-pipeline architecture of FIG. 1.
Figure 3:
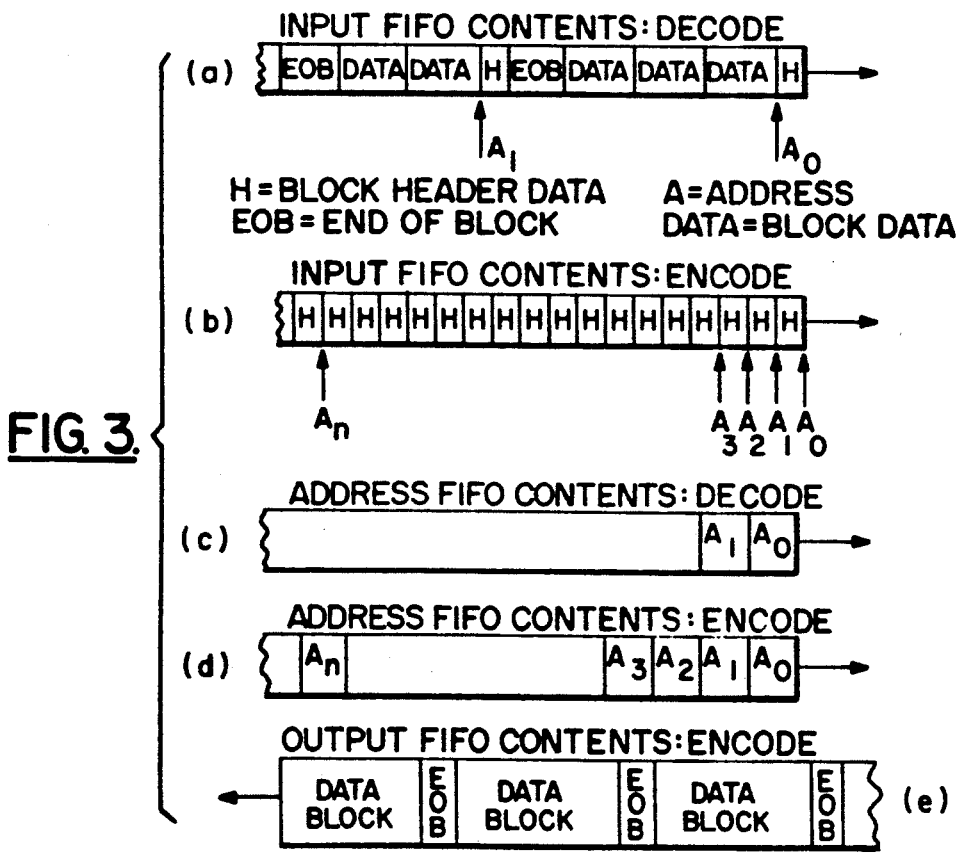
FIG. 3(a) shows an exemplary content of the Input FIFO of FIG. 2 for an image data decode operation.
FIG. 3(b) shows an exemplary content of the Input FIFO of FIG. 2 for an image data encode operation.
FIG. 3(c) shows an exemplary content of the Address FIFO of FIG. 2 for the image data decode operation of FIG. 3(a)
FIG. 3(d) shows an exemplary content of the Address FIFO of FIG. 2 for the image data encode operation of FIG. 3(b)
FIG. 3(e) shows an exemplary content of the Output FIFO of FIG. 2 for the image data encode operation of FIG. 3(b)

FIG. 2 is a simplified circuit block diagram showing an embodiment of an image data coding and decoding system that is constructed in accordance with the process-pipeline architecture of FIG. 1.

The purpose of the system is to perform compression (encoding) and decompression (decoding) of image data. For encoding, an image in an Image Memory 22 is passed to a Compression/Decompression (CODEC) device 24, and the resulting compressed data is placed in an Output FIFO 26 for subsequent storage. When decoding image data, compressed data in an Input FIFO 28 is passed to the CODEC 24, and the resulting decompressed data is stored in the Image Memory 22 for display and/or subsequent processing. A local Processor 30 is coupled between a local Memory 32 and the Output FIFO 26, the Input FIFO 28, and an Address FIFO 34. The Address FIFO 34 stores the initial addresses of blocks of decoded image data within the Image Memory 22, as described below. A Control Register 36 has an input coupled to the output of the Input FIFO 28 for receiving and storing data block Header (H) information. This Header information includes CODEC 24 control information, also as described below.

In this embodiment of the invention the CODEC 24 processes the image data using discrete cosine transform (DCT)-based compression algorithm. A presently preferred DCT approach is one based on the Joint Photographic Experts Group (JPEG) baseline, as described in ISO/IEC JTC1/SC2/WG8 CCITT SGVIII JPEG-8-R5.2 May 10, 1990. This algorithm divides a source image into 8×8 blocks of image data elements, and then processes each of the blocks. The processing of a block of image data is shown in the symmetric logic flow diagram of FIG. 5.

Prior to compression, image data is level shifted by subtracting 128 (8 bit precision). A DCT device processes blocks of 64 events and produces coefficients which are then quantized in accordance with a 64 entry lookup table of weights. The weights are based on a known response of the human eye to various frequencies. The result is a frequency dependent quantization which is then coded through a lossless entropy coding technique. Huffman variable length coding (VLC), as described by D. A. Huffman, "A Method for the Construction of Minimum-Redundancy Codes", Proc. IRE, September 1952, pp. 1098–1101, and run-length coding (RLC), as described by W. K. Pratt, Digital Image Processing, John Wiley & Sons, pp. 632, (1978), are two most-often employed lossless entropy coding techniques. Both of these techniques (VLC and RLC) take advantage of the fact that the stream of DCT coefficients frequently contains long runs of zeros.

The aforedescribed characteristics of the process-pipeline 12, when used in a CODEC-based image processing system, provides the following advantages.

Because of the inherent synchronization mechanisms, the system 10 user need not be concerned with the exact timing of the data transfers, so long as the processes in the process-pipeline 12 occur in correct sequence.

Also, the FIFO memory inserted between processes smoothes out fluctuations in the instantaneous transfer rates of the data flow.

Furthermore, the self-activated Local State Machine Control makes between-boundary processing wait states transparent, and thus relieves a programmer from having to consider a Global time schedule for the processes propagating through the process-pipeline 12.

Encode Processing

For encoding (compression), uncompressed source images are initially stored in the Image Memory 22. The Processor 30 first prepares the CODEC 24 for encode processing by loading internal tables and performing other necessary functions. The encode process is controlled by the LSM 18. Prior to initiating the encoding of a block of data, the LSM 18 reads the Input FIFO 28 to retrieve the block header (H). The header, containing CODEC 24 control information, is then stored in the Control Register 36 and applied to the CODEC 24. The Processor 30 then loads the Address FIFO 34 with Image Memory 22 source addresses for each image data block to be processed.

FIG. 3(b) shows an exemplary content of the Input FIFO 28 for the image data encode operation. As can be seen, the Input FIFO 28 contains a plurality of Header Blocks, each of which includes CODEC 24 control information for an associated data block of image data that is stored in the Image Memory 22 FIG. 3(d) shows an exemplary content of the Address FIFO 34 of FIG. 2 for the Input FIFO 28 contents of FIG. 3(b). FIG. 3(e) shows an exemplary content of the Output FIFO of FIG. 2 during and after the image encoding operation.

After providing the Header Information for a block of image data to the Control Register 36, LSM 18 sends a read request to the Image Memory 22 to read a block of image data into the CODEC 24. The CODEC 24 encodes the image data block and passes the compressed image data to the Output FIFO 26 for subsequent retrieval by the Processor 30. When the CODEC 24 completes the compression of a full block of data, it generates an End of Block (EOB) signal to the LSM 18 In response, the LSM 18 repeats the above described operations by retrieving the Header information for the next image data block from the Input FIFO 28, if there are more blocks to be processed. The LSM 18 determines that there are more blocks to be processed by the presence of a further Image Memory 22 source address in the Address FIFO 34, as indicated by the state of the Address FIFO 34 EMPTY signal line.

Decode Processing

For decoding (decompression), compressed blocks of image data are placed in the Input FIFO 28 by the Processor 30.

The Processor 30 initiates and maintains a record of any required block control parameters, such as those referred to below in regard to the DCTQ 42 and DCT 40 control bits. The decode process is controlled by the LSM 18. Prior to initiating the decode of a block of data, the LSM 18 reads the Input FIFO 28 to retrieve the Header of the block of image data to be processed. The Header, containing CODEC 24 control information, is then stored in the Control Register 36 and applied to the CODEC 24. The Processor 30 also loads the Address FIFO 34 with Image Memory 22 target addresses for each image data block to be processed.

FIG. 3(a) shows an exemplary content of the Input FIFO 28 for an image data decode operation. As can be seen, the Header information is interspersed with blocks of image data and End of Block (EOB) identifiers. FIG. 3(c) shows an exemplary content of the Address FIFO 34 of FIG. 2 for the Input FIFO 28 contents of FIG. 3(a).

Following this operation, the LSM 18 again reads the Input FIFO 28 to retrieve the first word of compressed data for the block. The CODEC 24 begins decoding the data and sends a READY indication to the LSM 18 for additional data. The LSM 18 continues to read the Input FIFO 28 in response to each CODEC 24 READY indication. The CODEC 24 identifies the EOB for a block of image data read from the Input FIFO 28 and indicates this condition to the LSM 18 by driving the EOB signal line. The LSM 18 waits until the decoded block of image data is transferred from the CODEC 24 to the Image Memory 22, and then repeats the above-described process if there are more blocks to be processed, as indicated by the state of the Address FIFO 34 EMPTY status signal line.

Section (C)

Figure 4:
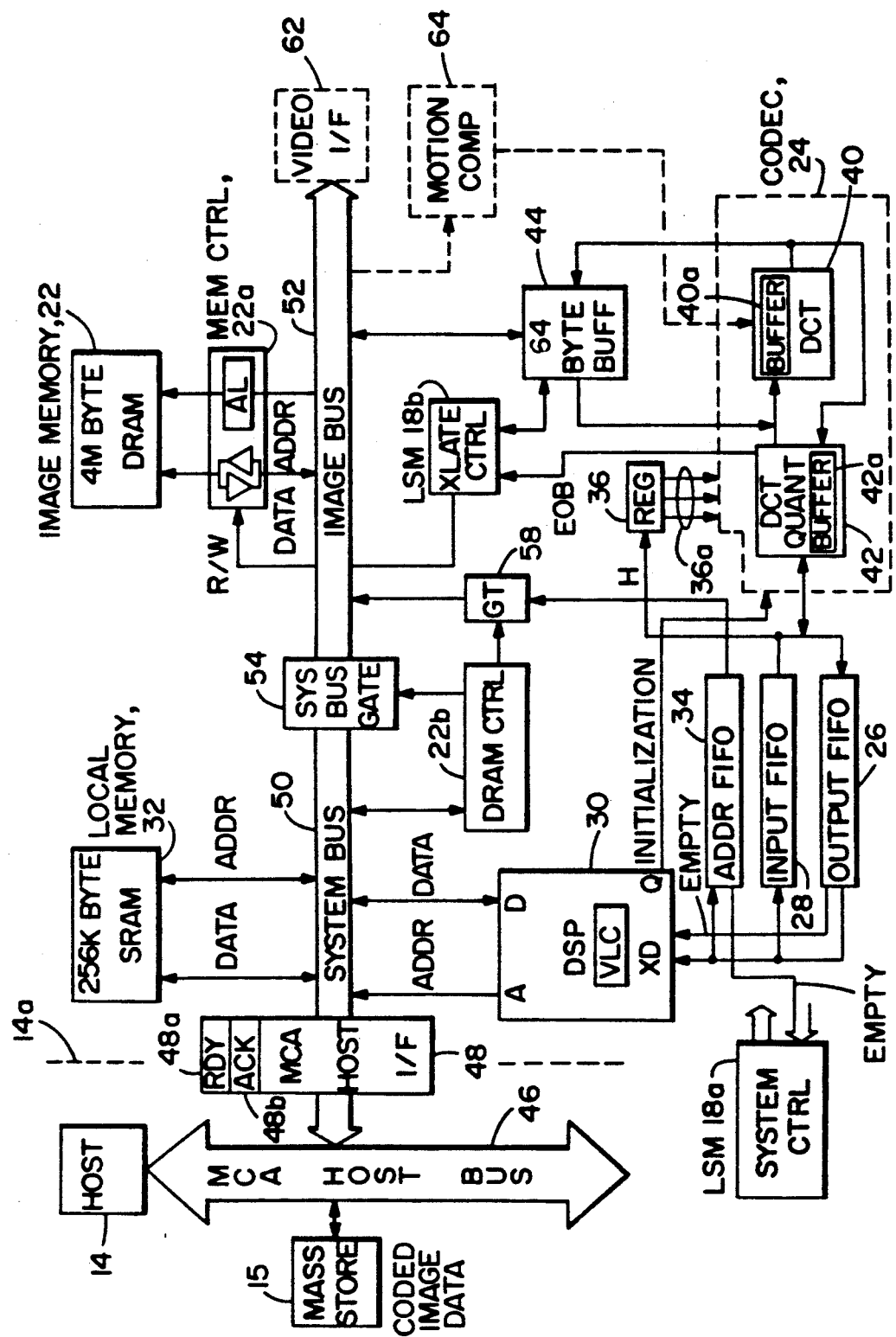
FIG. 4 is a detailed circuit block diagram of a presently preferred embodiment of the image data coding and decoding system shown in FIG. 2.

FIG. 4 is a detailed circuit block diagram of a presently preferred embodiment of the image data coding and decoding system shown in FIG. 2.

This embodiment of the invention is provided on a plug-in circuit card intended to be interfaced with a data processing system having a system bus that operates in accordance with the Micro Channel interface specification (Micro Channel is a registered Trademark of the International Business Machines Corporation of Armonk, N.Y.).

In this embodiment, the Local Memory 32 and Buffers$_i$ (FIFOs 26 and 28) are sized in accordance with the description provided above in Section (A). More specifically, the circuit card contains three 1K by 18 bit FIFOS 26, 28, and 34, and a 256 Kbyte Static Ram (SRAM) as the Local Memory 32. The circuit card also contains a local Processor 30, and two further processing devices (DCT 40, DCTQ 42) that comprise the CODEC 24. Devices 40 and 42 conform to the Joint Photographic Experts Group (JPEG) baseline specification.

In a presently preferred embodiment of the invention the DCT device 40 is a L64730 Discrete Cosine Transform Processor that is available from LSI Logic of Milepetas, Calif., and the DCTQ device 42 is a L64740 DCT Quantization Processor also available from LSI Logic. The construction and operation of the DCT 40 is described in a publication L64730 (July 1990), and the construction and operation of the DCTQ 42 is described in a publication L67440 (September 1990). These publications are also available from LSI Logic. Both of these devices include internal data buffers (BUFF 40a and BUFF 42a).

An external 64 byte translation buffer 44 operates in conjunction with the DCT 40 and the DCTQ 42, as described below.

Control logic is contained within Programmable Logic Devices (PLDs), specifically a SYSTEM CTRL LSM 18a and an XLATE CTRL LSM 18b. The circuit card functions to perform image data encode/decode specific processing.

Figure 5:
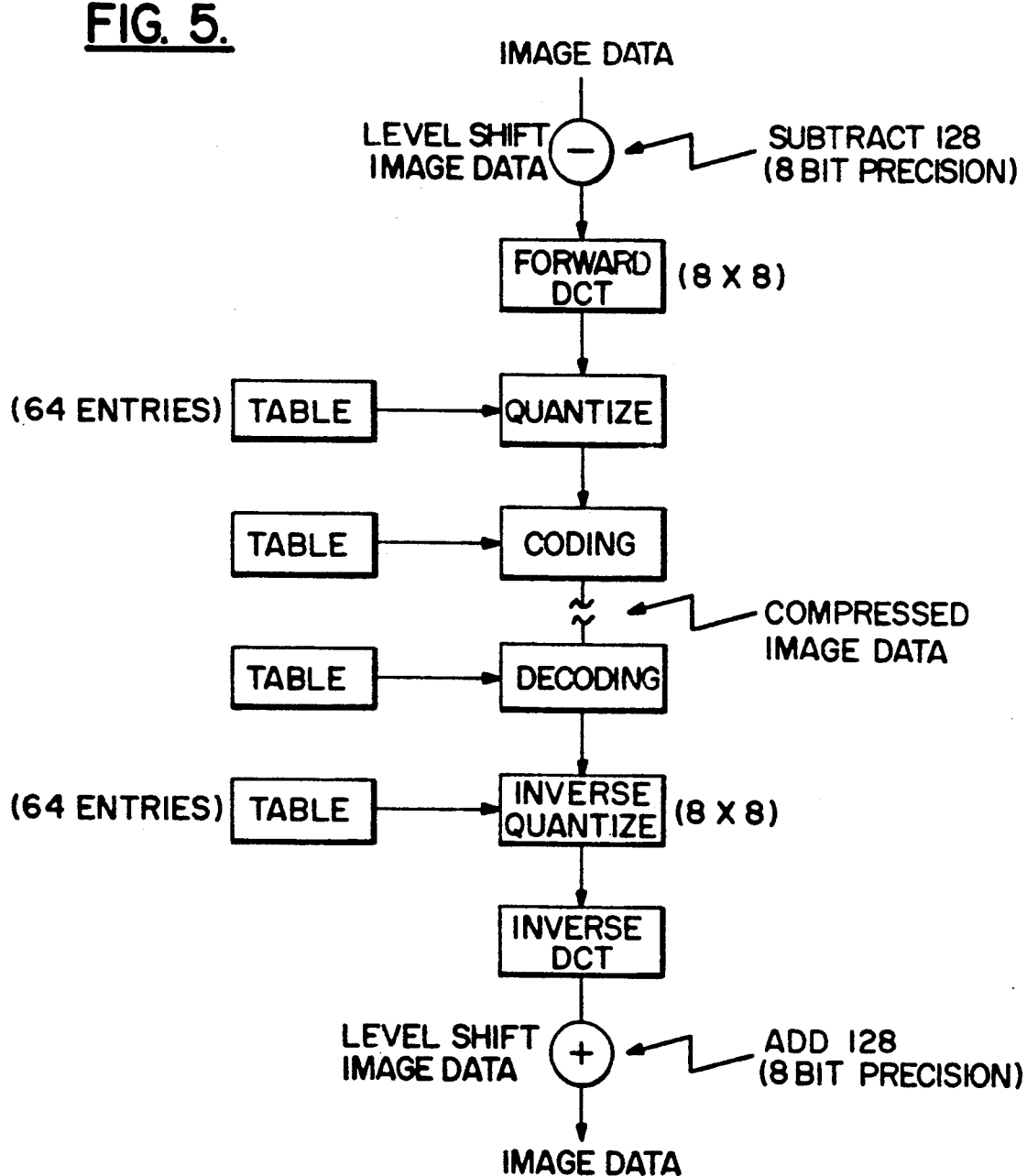
FIG. 5 is a logic flow diagram that illustrates a JPEG DCT (Joint Photographic Experts Group, Discrete Cosine Transform) -based image data coding model.

The abovedescribed JPEG compression/decompression algorithm that is illustrated in FIG. 5 can be divided into three tasks.
1. The nonadaptive Discrete Cosine Transform (DCT) based on 8-by-8 blocks of image elements.
2. The uniform midstep quantization of the DCT coefficient using weighting functions that are optimized for human visual perception and compacted by Run Length Coding (RLC).
3. Huffman VLC to reduce the entropy of the quantized DCT coefficients.

The system illustrated in FIG. 4 partitions these tasks such that the DCT 40 performs the nonadaptive DCT function, the DCTQ 42 performs the quantization function, and Run Length Coding (RLC), and the Processor 30 performs the VLC decompression function. As such, and referring briefly to FIG. 6, the Processor 30 corresponds to the Process$_i$ of FIG. 1, the DCTQ 42 corresponds to the Process$_{i+1}$ of FIG. 1, and the DCT 40 corresponds to the Process$_{i+2}$ of FIG. 1.

In general, the VLC function that is executed by the Processor 30, when encoding image data, is a table lookup operation that corresponds to a mapping between source symbols and variable-length codewords. When decoding image data, VLC is generally accomplished by tracing along a coding tree until the decoded data is reached. The VLC coder maps the input data into variable-length codewords. As was noted above, for the baseline JPEG method that is employed in the presently preferred embodiment, the Huffman coder is used to reduce the entropy of the quantized DCT coefficients. That is, the Huffman coder reduces the average number of bits that represent a symbol, without destroying the original identity of the symbol.

For image data decoding, compressed image data is moved, under Host 14 control, from a Host bus 46, through a Host bus Interface 48 and, via a System Bus 50, to the local SRAM 32. The system bus 50 and an Image Bus 52 are both contained within the confines of the circuit card, and are coupled together through a System Bus Gate 54. Synchronization of data transfers at the system resource interception boundary 14a is accomplished with two flags that are contained within the Interface 48. Specifically, a Ready (RDY) flag 48a is set by the Host 14 to indicate that a block of compressed image data has been stored in the SRAM 32. The RDY flag 48a is read by the Processor 30 and is used to initiate the decompression of the block of image data by the DCT 40 and the DCTQ 42.

At the termination of the encoding of a block of image data by the DCT 40, the DCTQ 42, and the VLC performed by Processor 30, an Acknowledge (ACK) flag 48b is set by the Processor 30 to indicate that a block of compressed image data has been stored within the SRAM 32. The ACK flag 48b is read by the Host 14 and is used to initiate the movement of the compressed block of image data to, by example, a mass storage device 15.

The local Processor 30 is embodied within a Digital Signal Processor (DSP) that performs interface functions, Header parsing on the compressed data stream, and VLC. One suitable embodiment for the DSP Processor 30 is a TMS320C30 device that is available from Texas Instruments. It should be realized that a Digital Signal Processor is not required to implement the invention, and that any digital data processor having the required speed and processing robustness may be employed. A Reduced Instruction Set (RISC) processor is another suitable processor-type.

DSP Processor 30 performs the VLC decompression function and composes blocks of Run Length Coded (RLC) image data from the data stored within the SRAM 32. Processor 30 also produces a Header (H) for each block. The Header contains, on a per-block basis, setup data for the DCT device 40 and the DCTQ device 42. The resulting data blocks are transferred by the DSP Host 30 to the data input FIFO 28 as 16-bit words. Each data block is preceded by its corresponding setup Header word, and terminated by an EOB symbol, as shown in FIG. 3(a). Each block of a data may include from one to 64 words of Run Length Coded (RLC) image data.

The DSP Processor 30 first initializes the DCTQ 42 by loading internal quantization tables and then, for each block, provides an Image Memory 22 target address for the block. The target address is loaded into the address FIFO 34, as shown in FIG. 3(c). This address is later used to store the decompressed block of image data in the Image Memory 22.

The SYSTEM CTRL 18a initiates image data processing when it detects that at least one address is contained in the Address FIFO 34. This condition is indicated by the EMPTY status flag of the address FIFO 34 being deasserted when the Processor 30 loads the first block address. In response to EMPTY being deasserted, the SYSTEM CTRL 18a reads the first block's Header from the Input FIFO 28 and stores the Header information in the register (REG) 36. REG 36 outputs control signals that are applied to the DCT device 40 and to the DCTQ device 42 to set their internal characteristics for processing the ensuing block data output from the Input FIFO 28.

Specifically, the DCTQ 42 receives four control bits from REG 36, the four bits being connected to the MODE.0, COMP0, COMP1, and RESPRED input terminals of the DCTQ 42. These terminals are used for controlling the following functions, as described in the above mentioned DCTQ publication L67440.

MODE.0 Selects one of two internal quantization tables

COMP0, COMP1 Selects a DC predictor

RESPRED Resets the internal DC predictors when high

The DCT 40 receives one control bit from the REG 36, the control bit being connected to an INTER input terminal. The signal on this terminal, when high, indicates that the device is to operate in an inter-frame mode.

In operation, the DCTQ device 42 produces 64 coefficients per data block which, after passing through the DCT device 40, become 64 bytes of decoded image data. In that the DCT device 40 produces a scrambled (but consistent) ordering of the output data, a translation is performed by the data buffer 44. This translation is accomplished by the XLATE CTRL 18b controlling the address inputs of the data buffer 44 so as to store the decoded image data in a desired order. The reordered 64 bytes of decoded image data are then stored within the Image Memory 22, beginning at the address contained in the Address FIFO 34. This address is applied through a Gate (GT) 58 to the address bus (ADDR) portion of the Image Bus 52, and is latched in an Address Latch (AL) contained within a Memory Controller (MEM CTRL) 22a. The contents of the AL are automatically incremented so as to store the entire 64 byte decoded data block. A Dynamic RAM Controller (DRAM CTRL) 22b controls the timing of the accessing of the 4 Mbytes of Dynamic RAM that comprise the Image Memory 22.

This process continues until the Address FIFO 34 becomes EMPTY, indicating that there are no further blocks of compressed image data to process.

For image data encoding, source images are contained in the Image Memory 22. The source images may be obtained from, by example, a camera that generates digital image data at 30 frames per second. The DSP Processor 30 prepares the circuit card for encode processing by loading the Input FIFO 28 with DCT and DCTQ setup Headers for each block (FIG. 3(b)), loading the DCTQ 42 with the appropriate quantization tables, and then loading the Address FIFO 34 with Image Memory 22 target addresses for each block (FIG. 3(d)).

The SYSTEM CTRL 18a initiates the encode process when it detects the presence of at least one address in the Address FIFO 34. The SYSTEM CTRL 18a reads the first address from the Address FIFO 34 and transfers the address to the Address Latch of the Memory Control 22a. Subsequently, the SYSTEM CTRL 18a initiates the access of the corresponding block of image data in the Image Memory 22. The SYSTEM CTRL 18a then reads the first block's Header from the Input FIFO 28 and stores the Header in REG 36. The stored Header information is applied to the DCT 40 and the DCTQ 42 to control encode processing parameters for the image block, as described above. Image data is read, under control of the XLATE CTRL 18b, from the Image Memory 22 into the buffer 44, which then passes 64 byte blocks to the DCT 40, also under control of the XLATE CTRL 18b. In the encode mode, the buffer 44 provides synchronization of the input data stream to both the DCT 40 and DCTQ 42. Coefficients output by the DCT 40 pass through the DCTQ 42 and become a stream of compressed 16-bit image "events". The image "events" are stored in the Output FIFO 26 for subsequent retrieval and VLC by the DSP Processor 30. The DSP Processor 30 has an input coupled to the EMPTY flag of the Output FIFO 26 for detecting when the first byte of compressed image data is stored therein.

So long as an address is present in the Address FIFO 34, the SYSTEM CTRL 18a continues to control of reading of block addresses from the Address FIFO 34 and block Headers from the Input FIFO 28, as well as the writing of encoded image block data to the Output FIFO 26.

As can be seen, the SYSTEM CTRL 18a is triggered by the presence of the first address to initiate the local processing of image data, and continues to control the processing of image data so long as an image data block address exists within the Address FIFO 34. Thus, the use of the Address FIFO EMPTY status flag decouples the operation of the fixed processing cycle Stages (DCTQ 42 and DCT 40) from the variable processing cycle Stage embodied in the Processor 30. Similarly, the use of the EMPTY status flag of the Output FIFO 26 decouples the Processor 30 from the fixed cycle DCT and DCTQ stages. Furthermore, in conjunction with the operation of the Processor 30, all image data processing (coding and decoding) is performed asynchronously to, and in parallel with, other processing tasks that may be performed by the Host 14.

It should be realized that although the description has focussed on the processing of a single block of data, that during normal operation a number of blocks are typically moving through the process-pipeline. For example, compressed image data is stored within the SRAM 32 awaiting decompression, the Processor 30 is performing the VLC operation on a data block being prepared for decompression, one or more data blocks already VLC'd by the Processor 30 are enqueued within the Input FIFO 28, and the CODEC 24 is processing a current data block under control of the Header information that is associated with the current data block.

Figure 6:
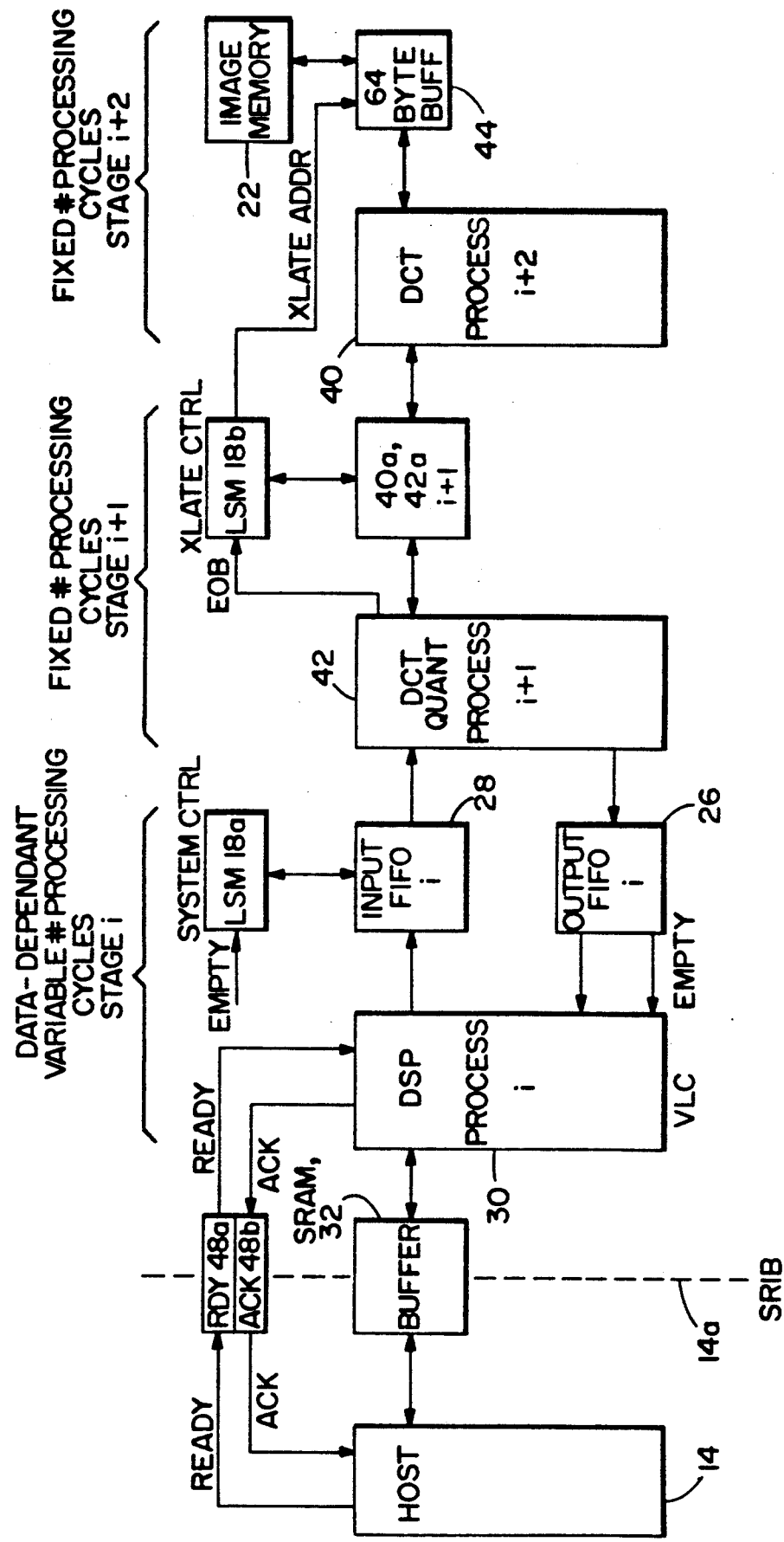
FIG. 6 is a block diagram that illustrates in greater detail the correspondence of the major functional blocks of FIG. 4 with the process-pipeline architecture of FIG. 1.

Referring to FIG. 6, there is shown a correspondence between the presently preferred embodiment of FIG. 5 and the novel process-pipeline architecture of FIG. 1. As can be seen, the synchronization of the data flow at the system resource interception boundary 14a is accomplished by the Processor 30, in conjunction with the RDY and ACK flags 48a and 48b, respectively. The SRAM 32 functions as the input and output buffers $(i-1)$ of FIG. 1. Stage$_i$ is comprised of the Processor 30, the SYSTEM CTRL LSM 18a, and the Input and Output FIFOs 28 and 26, respectively. The processing that occurs within Stage$_i$(VLC) is data dependent, and requires a variable number of processing cycles. Synchronization of the data flow between Stage$_i$ and Stage$_{i+1}$ is accomplished by the SYSTEM CTRL LSM 18a, in conjunction with the EMPTY flag of the Address FIFO 34 (not shown in FIG. 6). Stage$_{i+1}$ and Stage$_{i+2}$ are comprised of the DCT Quant 42 and the DCT 40, respectively. These stages operate in a data-independent manner and have a fixed number of processing cycles for each data block. Buffers$_{i+1}$ of FIG. 1 are implemented with the internal buffers 40a and 42a of the DCTQ 42 and the DCT 40. Control of the data movement to and from the 64 Byte Buffer 44 and the Image Memory 22 is accomplished by the XLATE CTRL LSM 18b.

Although described above in the context of a system for compressing and decompressing blocks of image data in real time, the process-pipeline architecture of FIG. 1 may be also be applied to data processing applications other than image processing. Also, a number of modifications may be made to the presently preferred embodiment of the invention that is shown in FIG. 5. For example, the operation of the image processing system may be enhanced with the addition of a block 64 that performs motion compensation in accordance with the MPEG (Motion Picture Experts Group) standard. For this enhancement, two frames of image data that are stored within the Image Memory 22 are subtracted and are processed by the DCT 40. Also, other functions may be provided by coupling a video Interface 62 to the image bus 52, and exporting and importing image data through the video interface 62. These other functions may include, and are not limited to, image scaling, color conversion, filtering, rotation, recomposition, and depth cueing. Similarly, the DCT 40 and the DCTQ 42 may be replaced by other image processing circuitry to perform functions other than image data encoding and decoding.

Thus, while the invention has been particularly shown and described with respect to preferred embodiments thereof, it will be understood by those skilled in the art that changes in form and details may be made therein without departing from the scope and spirit of the invention.

Having thus described our invention, what we claim as new, and desire to secure by Letters Patent is:

1. A sequential process-pipeline for use in a data processing system, comprising:
    a plurality of processing stages each of which executes a Process on data organized as data blocks, said plurality of processing stages being serially coupled one to another for passing data blocks therebetween, a first one of said processing stages being coupled, at a data processing system resource interception boundary, to the data processing system for inputting data from and for outputting data to the data processing system at a first data rate, a last one of said processing stages being coupled to a data source and/or a data sink operating at a second data rate that differs from the first data rate;
    each of said processing stages including data buffer means interposed between the processing stage and an adjacent processing stage, said first processing stage further including interface data buffer means interposed between the data processing system resource interception boundary and the first processing stage; and wherein
    a SIZE of each of said data buffer means that are interposed between adjacent processing stages is determined in accordance with the relationship:

$$\text{SIZE OF BUFFER}_i = (RP_i - RP_{i+1}) \times P_{max},$$

where, for a processing stage that executes a Process$_i$, where i is Process sequence number associated with the processing stage in the process-pipeline,
    Pmax is a maximum time required to completely process a data block with the Process$_i$,
    $RP_i$ is a data rate produced by the Process$_i$, and
    $RP_{i+1}$ is a data rate from a next following Process$_{i+1}$.

2. A sequential process-pipeline as set forth in claim 1 wherein, for the first processing stage, a SIZE$_{13}$ SRIB of said interface data buffer means at the system resource interception boundary (SRIB) is determined in accordance with the relationship:

$$\text{SIZE\_SRIB} = (RP_i - RP_{i+1}) \times T_{max},$$

where,
    Tmax is a maximum time required to accomplish a non-computational event.

3. A sequential process-pipeline as set forth in claim 1 and further including local control means associated with each of said processing stages for controlling the execution of the Process by the processing stage.

4. A sequential process-pipeline as set forth in claim 1 wherein said data blocks are comprised of image data.

5. A sequential process-pipeline as set forth in claim 4 wherein one of said processing stages executes a Discrete Cosine Transformation Process, one of said processing stages executes a Discrete Cosine Transformation Quantization Process, and wherein one of said processing stages executes a Process to reduce an entropy of quantized Discrete Cosine Transformation coefficients.

6. An image processing system, comprising:
    a sequential process-pipeline comprised of a plurality of processing stages each of which includes means for executing a Process on image data organized as image data blocks, said plurality of processing stages being serially coupled one to another for passing image data blocks therebetween, a first one of said processing stages being coupled to a data processing system for inputting compressed image data from and for outputting compressed image data to the data processing system; wherein
    said first one of said processing stages is coupled to a second one of said processing stages through a plurality of buffer means, including an image data input buffer means, an image data output buffer means, and an address buffer means, said address buffer means storing addresses each of which identifies an initial address of a block of addresses within an image memory means, each block of addresses storing a block of decompressed image data.

7. An image processing system as set forth in claim 6 wherein said second one of said processing stages is further coupled to a third processing stage, said second and third processing stages each including means for performing a decompression Process of a block of image data; wherein said processing means of said first processing stage stores at least one block of compressed image data within said input buffer means and an address within said address buffer means, the address identifying the initial block of addresses within said image memory means wherein the decompressed image data is to be stored at the completion of the decompression Process.

8. An image processing system as set forth in claim 7 and further comprising means, responsive to the storage of the address within said address buffer means, for initiating said processing means of said second and said third processing stages to perform the decompression Process on the block of image data stored within said input buffer means.

9. An image processing system as set forth in claim 8 wherein said processing means of said first processing stage also stores information in said input buffer means for specifying decompression Process control information to said processing means of said second and said third processing stages, and wherein said initiating means further includes means for reading out the information and for applying the information to said processing means of said second and said third processing stages.

10. An image processing system as set forth in claim 6 wherein said second one of said processing stages is further coupled to a third processing stage, said second and third processing stages each including means for performing a compression Process on a block of image data; wherein said processing means of said first processing stage stores information in said input buffer means for specifying compression Process control information to said processing means of said second and said third processing stages, said processing means of said first stage further storing an address within said address buffer means, the address identifying an initial address of a block of addresses, within said image memory means, wherein is stored a decompressed block of image data that is to be compressed.

11. An image processing system as set forth in claim 10 and further comprising means, responsive to the storage of the address within said address buffer means, for initiating said processing means of said second and said third processing stages to perform the compression Process on the block of image data stored within said image buffer means.

12. An image processing system as set forth in claim 10 wherein said processing means of said second processing stage stores the compressed block of image data into said output buffer means, and wherein said processing means of said first processing stage is responsive to the storage of compressed image data within said output buffer means to read out said compressed image data.

13. An image processing system as set forth in claim 6 wherein said second one of said processing stages is further coupled to a third processing stage, and wherein:

said third processing stage executes a Discrete Cosine Transformation Process on a block of image data to generate a plurality of coefficients;
said second processing stage executes a Discrete Cosine Transformation Quantization Process on a block of image data; and wherein said first processing stage executes a Process to reduce an entropy of the quantized Discrete Cosine Transformation coefficients.

14. An image processing system, comprising:
means for interfacing said image processing system to a Host data processing system, said interface means including a memory buffer means for storing compressed image data that is received from, and that is output to, the Host data processing system;
first processor means coupled to said memory buffer means for composing into blocks of compressed image data the compressed image data that is received from the Host data processing system;
image buffer means for storing uncompressed image data; and
means for compressing and decompressing (CODEC) blocks of image data, said CODEC means being interposed between said image buffer means and said first processor means, said CODEC means being coupled to said first processor means through processor buffer means, said processor buffer means including an image data input buffer means, an image data output buffer means, and an address buffer means, said address buffer means storing addresses each of which identifies an initial address of a block of addresses within said image memory means, each block of addresses storing a block of decompressed image data.

15. An image processing system as set forth in claim 14 wherein said first processor means stores at least one block of compressed image data within said input buffer means and an address within said address buffer means, the address identifying the initial block of addresses within said image memory means wherein the decompressed image data is to be stored at the completion of the operation of said CODEC means in decompressing the at least one block of compressed image data.

16. An image processing system as set forth in claim 15 and further comprising means, responsive to the storage of the address within said address buffer means, for initiating said CODEC means to decompress the block of image data stored within said input buffer means.

17. An image processing system as set forth in claim 15 wherein said first processor means also stores information in said input buffer means for specifying, for the block of image data, decompression control information to said CODEC means.

18. An image processing system as set forth in claim 17 and further comprising means, responsive to the storage of the address within said address buffer means, for initiating said CODEC means to decompress the block of image data stored within said input buffer means, and wherein said initiating means further includes means for reading out the information and for applying the information to said CODEC means prior to the operation of said CODEC means in decompressing the block of compressed image data.

19. An image processing system as set forth in claim 14 wherein said first processor means stores information in said input buffer means for specifying compression control information to said CODEC means and also stores an address within said address buffer means, the address identifying an initial address of a block of addresses within said image memory means, the block of addresses storing an uncompressed block of image data that is to be compressed.

20. An image processing system as set forth in claim 19 and further comprising means, responsive to the storage of the address within said address buffer means, for initiating said CODEC means to compress the uncompressed block of image data stored within said image buffer means.

21. An image processing system as set forth in claim 14 wherein said CODEC means includes:
a second processor means for executing a Discrete Cosine Transformation Process on a block of image data to generate a plurality of coefficients;
a third processor means for executing a Discrete Cosine Transformation Quantization Process on a block of image data; and wherein
said first processor means executes a Process to reduce an entropy of the quantizied Discrete Cosine Transformation coefficients.

22. A method of defining a sequential process-pipeline for use in a data processing system, comprising the steps of:
defining a plurality of data processing stages each of which executes a Process on data organized as data blocks, each data block being comprised of a plurality of data elements that are operated on as a group, each of said stages being defined so as to segregate data-dependent Processes from data-independent Processes;
serially coupling the plurality of defined data processing stages one to another in an order selected for accomplishing a desired Processing function; and
providing, at an interface between adjacent ones of the serially coupled data processing stages, data block Buffer means and a local control means for controlling the transfer of data blocks across the interface.

23. A method of defining a sequential process-pipeline for use in a data processing system, comprising the steps of:
defining a plurality of data processing stages each of which executes a Process on data organized as data blocks, each of said stages being defined so as to segregate data-dependent Processes from data-independent Processes;
serially coupling the plurality of defined data processing stages one to another in an order selected for accomplishing a desired Processing function;
providing, at an interface between adjacent ones of the serially coupled data processing stages, data block Buffer means and a local control means for controlling the transfer of data blocks across the interface;
coupling one of the data processing stages, at a data processing system resource interception boundary, to the data processing system for inputting data from and for outputting data to the data processing system at a first data rate; and
coupling a second one of the data processing stages to a data source and/or a data sink operating at a second data rate that differs from the first data rate.

24. A method as set forth in claim 23 and further including the step of operating a stage$_i$ of the sequential process-pipeline in accordance with the criteria:
IF Asys is greater than Pmax AND IF a Buffer$_{i-1}$ is NOT EMPTY
Tmax=Asys;
start a PROCESS$_i$ for every Tmax cycle;
ELSE IF Asys is not greater than Pmax AND IF the Buffer$_{i-1}$ is NOT EMPTY
start the PROCESS$_i$ for every Pmax cycle; END IF; wherein
Asys is a maximum time required to perform a data processing system resource arbitration,
Tmax is a maximum time required to accommodate a non-computational data processing event, and
Pmax is a maximum time required for processing the PROCESS$_i$.

* * * * *